US011328865B2

(12) United States Patent
Crawford et al.

(10) Patent No.: US 11,328,865 B2
(45) Date of Patent: May 10, 2022

(54) METHOD OF WINDING

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto (CA)

( * ) Notice: Subject to any disclaimer, the term of this patent is extended or adjusted under 35 U.S.C. 154(b) by 216 days.

(21) Appl. No.: 16/289,574

(22) Filed: Feb. 28, 2019

(65) Prior Publication Data

US 2019/0267187 A1 Aug. 29, 2019

Related U.S. Application Data

(60) Provisional application No. 62/636,244, filed on Feb. 28, 2018.

(51) Int. Cl.
| | |
|---|---|
| *H01F 41/066* | (2016.01) |
| *H05B 6/36* | (2006.01) |
| *H01F 41/064* | (2016.01) |
| *H01F 41/071* | (2016.01) |

(52) U.S. Cl.
CPC ......... *H01F 41/066* (2016.01); *H01F 41/064* (2016.01); *H01F 41/071* (2016.01); *H05B 6/36* (2013.01)

(58) Field of Classification Search
CPC .... H01F 41/066; H01F 41/064; H01F 41/071; H01F 41/06; H05B 6/36
See application file for complete search history.

(56) References Cited

U.S. PATENT DOCUMENTS

| | | | | |
|---|---|---|---|---|
| 5,403,540 A | * | 4/1995 | Brundage | H05B 6/106 219/602 |
| 9,214,847 B2 | * | 12/2015 | Manabu | H02K 15/0464 |
| 2009/0282890 A1 | * | 11/2009 | Mayfield | B23P 11/005 72/402 |
| 2010/0271165 A1 | * | 10/2010 | Debray | H01F 7/202 336/221 |
| 2016/0376966 A1 | * | 12/2016 | Crawford | F01N 3/2835 60/284 |
| 2017/0022868 A1 | * | 1/2017 | Crawford | F01N 3/2828 |

* cited by examiner

*Primary Examiner* — Peter Dungba Vo
*Assistant Examiner* — Jose K Abraham
(74) *Attorney, Agent, or Firm* — Stuart L. Wilkinson

(57) ABSTRACT

As wire is wound around and onto the surface of a former to form a coil, perturbations such as waves are introduced into turns of the coil, each perturbation being formed in a length of the wire less than the full length of a respective turn and projecting along the former surface, the perturbation having an initial shape and size. The coil is taken from the former and fixed in form. A surrounding jacket is radially collapsed onto the wire coil to uniformly press the coil against an internal compressible body in the course of which the overall diameter of the coil is reduced. Resulting stresses in the wire generated during the collapse are relieved by alteration of the perturbations from their initial shape and size to a subsequent shape and size.

15 Claims, 2 Drawing Sheets

METHOD OF WINDING

FIELD OF THE INVENTION

This invention relates to a method of winding and has particular application to winding induction heating wire for use in an induction heated gaseous emissions treatment unit.

BACKGROUND

Catalytic converters, particulate filters and like assemblies for installation in vehicles generally have an outer housing or can. In use, emissions gas is delivered to the assembly by an exhaust pipe and treated gas leaves the converter through a tail pipe. In the course of assembly, a sheet metal jacket is collapsed down onto interior components of the assembly to form the can. Typically, such an assembly has a ceramic substrate body along which extend cells for the passage of exhaust gas which is treated while in the cells to render the gas less noxious. Such treatment occurs in the course of chemical reactions that require the assembly to reach a sufficiently high, so-called 'light off' temperature. U.S. Pat. No. 9,488,085 describes a structure and method for inductively heating such an assembly. Metal is located at predetermined locations in the ceramic substrate body and an electromagnetic field generator is mounted adjacent the substrate body for generating a varying electromagnetic field inductively to heat the metal and so heat the substrate.

Typically, the magnetic field generator includes an induction wire coil which coils around interior elements of the assembly. The assembly elements may include an annular cylindrical magnetic flux concentrator (MFC) located radially outside the coil which acts as a shield to inhibit radially outwardly directed magnetic field and consequent heating outside the shield and acts as a concentrator to focus magnetic field and consequent heating radially inside the MFC. Between the external can and the MFC is a layer of heat resistant, compressible fibrous matting. This layer provides electrical and thermal insulation of the MFC and internal elements from the can and provides some protection of the assembly elements from vibration. The fibrous matting is configured in terms of shape, thickness and composition to reduce the chance of damage at interfaces between the can and the MFC where surface shapes are mismatched, especially during the controlled collapsing of the sheet metal to form the can. A second layer of heat resistant, compressible fibrous matting is located between the coil and the incompressible ceramic core and has similar functions and effect as the outer matting layer.

SUMMARY OF THE INVENTION

To further reduce the risk of damage during can formation, according to an aspect of the invention, in a method of winding the induction wire around and onto the surface of a former to form a coil, one or more perturbations are introduced into each winding, the perturbation being formed in a length of wire less than the full length of a respective turn or winding. The perturbation is laid so as to project along the surface of the former. The perturbation has an initial shape and size such that when a surrounding jacket is uniformly radially collapsed down onto the coil to compact the coil against a non-compressible core. Resulting stresses in the wire generated during compaction are relieved by alteration of the perturbation from an initial shape and size to a subsequent shape and size.

One effect of winding the induction wire in this way is to reduce the incidence of breakage when the coil is forced radially inwardly in the course of collapsing the can material and onto an induction heating (IH) gaseous emissions treatment assembly. Coil breakage would render the final assembly useless because the required magnetic field for heating could not be generated. The winding method also negates to some extent the tendency for small lengths of the winding to separate or bulge from the surface of IH interior elements during compaction. Such wire distortion could have any of a number of adverse effects, one being the tearing of compressible fibrous matting adjacent the coil in the IH assembly which could affect the electrical and/or thermal insulation and also increase the risk of vibration damage. Distortion can also cause overlapping of induction coil turns resulting, in turn, in electrical interference and/or damage to the wire. Wire distortion can also result in damage to the wire insulation sheath if wire is caused to bear against a hard part of the assembly such as the MFC, the ceramic or another coil winding. Damage to the sheath can reduce the electrical insulating value with an attendant risk of shorting or reduced lifespan. The ceramic substrate is quite fragile and bulging in one part of the winding can reduce the winding diameter in an adjacent part of the winding. This, in turn can cause deflection into the ceramic with possible piercing of the thin walls and consequent direct exposure of the coil to hot exhaust gas when the converter is in use. Another adverse effect is that the collapsing down of the outer jacket may cause a coil turn at the end of the coil to jump out of the MFC. Typically, the coil resides in a pocket or recess in the MFC for maximum electromagnetic efficiency. If the last winding jumps from the pocket, this will distort the electromagnetic signature and thus the efficiency.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 4 shows a view from one side of a former illustrating a method of winding an induction heating coil onto the former according to an embodiment of the invention.

FIG. 5 shows a view from one side of the induction coil of FIG. 4, after the coil has been fitted onto a compressible body and has been uniformly compacted against the compressible body to reduce the diameter of the coil.

DETAILED DESCRIPTION OF THE INVENTION INCLUDING THE PRESENTLY PREFERRED EMBODIMENTS

Figure 1A:
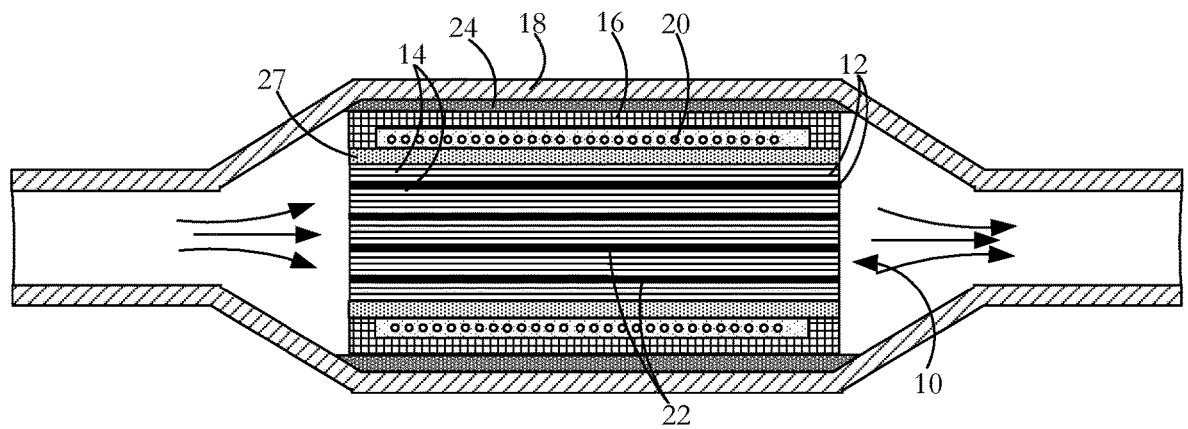
FIG. 1A is a longitudinal sectional view of an inductively heated gaseous emissions treatment unit at a stage in the manufacture thereof and showing a coil that has been wound according to a method according to an embodiment of the invention.
Figure 2:
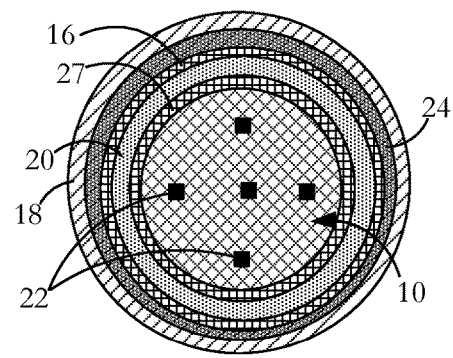
FIG. 2 is a cross-sectional view of the unit of FIG. 1A.

A gaseous emissions treatment assembly may take any of a number of forms. Typical of these is a catalytic converter formed as a concentric assembly and having a cylindrical substrate body 10 usually made of ceramic material and often called a brick, an example of which is shown in FIGS. 1A and 2. The brick has a honeycomb structure in which a number of small area passages or cells 12 extend the length of the brick, the cells being separated by walls 14. There are typically from 400 to 900 cells per square inch (cpsi) of cross-sectional area of the substrate body 10 and the walls are typically in the range 0.003 to 0.008 inches in thickness. Typically, the ceramic substrate body 10 is formed in an extrusion process in which green ceramic material is extruded through an appropriately shaped die and units are cut successively from the extrusion, the units being then cut into bricks. The areal shape of the cells or passages 12 may be whatever is convenient for contributing to the overall strength of the substrate body 10 while presenting a large contact area at which flowing exhaust gases can interact with a hot catalyst coating the interior walls of the cells. In other gaseous emissions treatment such as particulate filters, there may or may not be a catalyst coating on the passage walls. In particulate filters, a checkerboard subset of cells have their front ends plugged, a 'reverse' checkerboard subset of cells have their back ends plugged, and gaseous emissions are treated by being driven though porous walls of the honeycomb structure from cells of the first subset into cells of the reverse subset.

In the catalytic converter, interiors of the tubular cells 12 are wash-coated with a layer containing a particular catalyst material. A wash-coat typically contains a base material, suitable for ensuring adherence to the cured ceramic material of the substrate body, and entrained particulate catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that brick walls themselves present catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as NOX) in the exhaust gas. A preferred reductant is aqueous urea (2(NH2)2CO which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR NOx reduction processes to take place. Other catalytic converters in which the present invention finds application for preheating or supplementary heating are lean NOX catalyst systems, lean NOX trap systems and non-selective catalytic reduction systems. The present invention is applicable also to each of these nitrogen oxide emissions treatment assemblies.

A gaseous emissions treatment assembly may have a series of the substrate bodies or bricks 10, each having a particular catalyst layer or emissions treatment mode depending on the noxious emission to be reduced or neutralized. Gaseous emissions treatment bricks may be made of materials other than fired ceramic, such as stainless steel. Also, they may have different forms of honeycombed cells or passages than those described above. For example, cells can be round, square, hexagonal, triangular or other convenient cross-sectional shape. In addition, if desired for optimizing strength and low thermal capacity or for other purposes, some of the extruded honeycomb walls can be formed so as to be thicker than other of the walls or formed so that there is some variety in the shape and size of cells. Junctions between adjacent interior cell walls can be sharp angled or can present curved profiles.

Figure 1B:
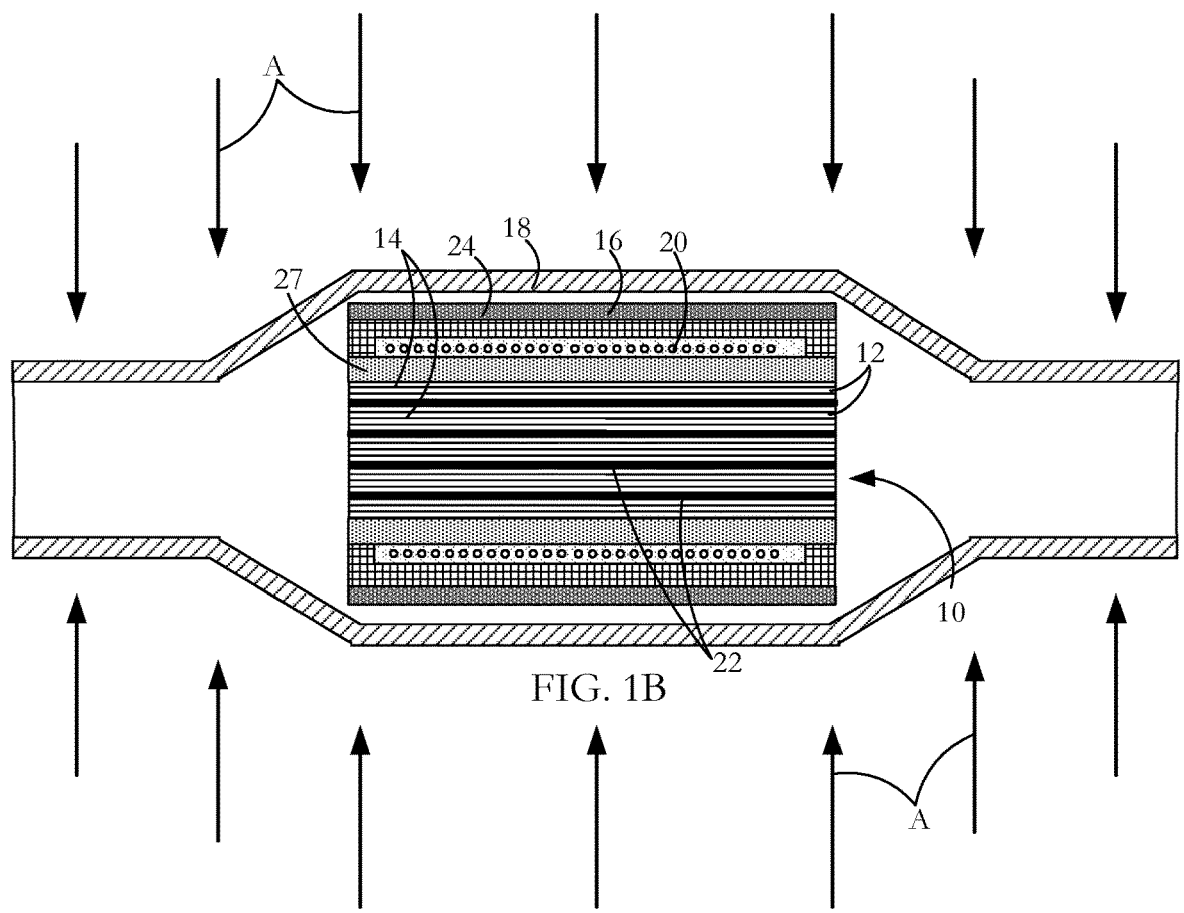
FIG. 1B is a longitudinal sectional view corresponding to that of FIG. 1A but at an earlier stage in the manufacture thereof

Typically, as shown in FIG. 1, the wash-coated ceramic honeycomb brick 10 is wrapped in a ceramic fibrous expansion blanket 16. A metal casing or can 18 transitions between the parts of an exhaust pipe (not shown) fore and aft of the gaseous emissions treatment unit so as to encompass the blanket wrapped brick. The casing 18 is typically made up of two parts which are welded to seal the brick in place. The expansion blanket 16 provides a buffer between the casing 18 and the brick 10 to accommodate their dissimilar thermal expansion coefficients. The metal of the sheet metal casing 18 expands much more than the ceramic material of the brick at a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body 10.

In use, the encased brick (or bricks) is mounted in the vehicle exhaust line to receive exhaust gases from the engine and to pass them to the vehicle tail pipe. The passage of exhaust gases through the gaseous emissions treatment unit heats the ceramic brick 10 to promote catalyst activated processes where the flowing gases contact the catalyst layer. Especially when the vehicle engine is being run at optimal operating temperature and when there is substantial throughput of exhaust gases, such treatment units operate substantially to reduce the presence of noxious gaseous emissions entering the atmosphere. Such units have shortcomings however at start-up when the interior of the brick is at low temperature, during idling during city driving or when waiting for a coffee at a Tim Hortons drive-through, and between electric driving periods for hybrid vehicles.

Brick shape, profile and cell densities vary among different manufacturers. For example, some bricks are round and some are oval. Some assemblies have single stage bricks that are generally heavily wash-coated with the catalyst metals, while others may have two or three bricks with different wash-coatings on each brick. Some exhausts have 900, 600 and 400 cpsi cell densities used in the full exhaust assembly, while others use only 400 cpsi bricks throughout. A close-coupled converter may be mounted up close to the exhaust manifold with a view to reducing the period between start-up and light-off temperature. An underfloor converter can be located further from the engine where it will take relatively longer to heat up but be relatively larger and used to treat the majority of gases once the exhaust assembly is up to temperature. In another configuration, a unit for reducing the period to light-off temperature and a unit to deal with high gas flow after light-off are mounted together in a common casing.

At one or more locations in the assembly, sensors mounted in the exhaust gas flow including within or adjacent the substrate body provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter. The structures and operating methods described below for indirectly heating the catalyst layers and the exhaust gases can be used with each of a close-coupled catalytic converter, an underfloor converter, and a combination of the two. Outputs from the temperature sensors are taken to a controller at which the monitored temperature or temperatures are used to control when induction heating is switched on and off. Using an appropriate algorithm implemented at the controller, the monitored temperatures may also be used to control specific effects of the applied heating processes to achieve a particular heating pattern.

As described in U.S. Pat. No. 9,488,085, the gaseous emissions treatment assembly such as that shown in FIGS. 1 and 2 is modified to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000 s to 1,000,000 s cycles per second (Hz) depending on the material, mass, and shape of the ferromagnetic metal body. Magnetic domain polarity is not easily reversed and the resistance to reversal causes further heat generation in the metal.

Figure 3:
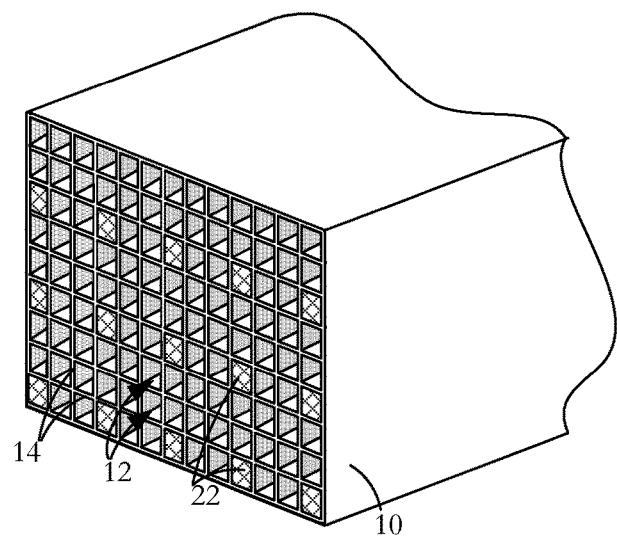
FIG. 3 is a perspective sectional view of a part of a gaseous emissions treatment unit of FIG. 1A showing metal inserts located in cells of a substrate body.

As illustrated in FIGS. 1 and 2, surrounding the ceramic substrate body 10 is a metal coil 20 and, located within selected ones of the cells 12 are metal pins, rods, wires or other metal inserts 22 (FIG. 3). By generating a varying electromagnetic field at the coil 20, a chain reaction is initiated, the end result of which is that after start-up of a vehicle equipped with an exhaust system embodying the invention, light-off temperature may be attained more quickly in the presence of the varying electromagnetic induction field than if there were no such field. The chain reaction is as follows: the varying electromagnetic field induces eddy currents in the metal elements 22; the eddy currents cause heating of the metal elements; heat from the metal elements 22 is transferred to the ceramic substrate body 10; heat from the heated substrate body 10 is transferred to exhaust gas as it passes through the emissions control unit; and the heated exhaust gas causes catalytic reactions to take place more quickly at the walls 14 compared to unheated exhaust gas. Conduction from the heated wires, pins or other filling elements 22 is the primary source of heat transfer to the ceramic substrate 10 and therefore to the exhaust gases when the emissions unit is in operation. There is also a small amount of convective and radiated heat transfer at any small air gaps between a wire and the interior surface of the cell within which it is contained.

The coil 20 is a wound length of copper tube, although other materials such as copper wire or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter. Windings of the coil 20 are spaced from the nearest inductance metal wires 22 to prevent significant heat transfer from the wires 22 to the coil 20 which would otherwise increase the coil resistivity and so lower its efficiency.

A layer 24 of electromagnetic field shielding/concentrating material is located immediately outside the coil 20 to provide induction shielding and to reduce induction loss to the metal converter housing. The layer 24 also acts to increase inductive coupling to the metal in the substrate body 10 to focus heating. The magnetic flux concentrator (MFC) 24 can be made from a ferrite or other high-permeability, low-power-loss materials such as Giron, MagnetShield, Papershield, Finemet, CobalTex, carbonyl or other magnetic shielding material that can be arranged to surround some or all of the windings of the coil 20. In particular, the magnetic shield 24 operates as a magnetic flux concentrator, flux intensifier, diverter, or flux controller to contain the magnetic fields within the substrate body. The magnetic shield lowers loss by mitigating undesirable heating of adjacent conductive materials. Without the magnetic shield/concentrator 24, magnetic flux produced by the coil 20 could spread around the coil 20 and link with the electrically conductive surroundings such as the metal casing 18 and other surrounding metal in an exhaust system, and/or other components of an internal combustion engine, vehicle, generator or other electrical system or host system, decreasing the life of these components and increasing energy loss. In addition, the layer 24 operates to direct or concentrate the magnetic field to the substrate body 10 providing selective or enhanced heating of a desired region of the substrate body 10, for example, by redirecting magnetic flux that would otherwise travel away from that desired region. In particular, the layer 24 operates to concentrate the magnetic flux produced by the coil 20 in the direction of the metal wires or rods 22 in the substrate body 10 for more efficient heating. As an additional benefit, the magnetic shield can improve the electrical efficiency of the induction coil 20 by increasing power transfer.

The coil is contained in a fiber insulation sheath 16 with the sheathed coil being encased in cast, cured insulation. The sheath functions both to stabilize the coil position and to create an air-tight seal to confine passage of the exhaust gases through the ceramic honeycomb substrate body_10 where catalytic action takes place. The insulation also provides a barrier to prevent the induction coil 20 from shorting on the can 18 or the MFC 24. The insulation is suitably alumino-silicate mastic. Alternatively, the substrate body can be wrapped in an alumino-silicate fiber paper. In one manufacturing method, the copper coil 20 is wrapped around the substrate body and then placed in the casing or can 18. In an alternative manufacturing method, the coil 20 is placed in the can or casing 18 and the substrate body 10 is inserted into the coil/can assembly. A further layer 27 of fibrous insulation is positioned between the sheathed coil and the cylindrical substrate body 10.

In use, a varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An insulated gate bipolar transistor (IGBT) or metal-oxide-semiconductor field effect transistor (MOSFET) high speed switch is used to change the direction of electrical flow through the coil. In terms of the effect of a varying electromagnetic induction field on metal in the ceramic substrate body, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements or having them reach Curie point. A suitable power input to a single brick coil is of the order of 1.1 kw.

As previously described, inserts 22 such as wires, pins or other filling made of ferromagnetic or other metal are located at selected locations of the ceramic substrate body 10 as shown in the detail view of FIG. 3. In the case of wires, they may be fixed in place by a friction fit at least partially achieved by closely matching the wire exterior area dimensions to the cell area dimensions so that surface roughness of the wire surface and the cell walls 14 holds the wires 22 in place. Additionally, a wire can be formed with a resiliently flexible element (not shown) which is flexed from a rest condition as the wire is inserted into a cell so that a part of the wire bears against an interior wall of the cell 12 and so provides frictional retention. The overall friction fit can be such as to resist gravity, vibration, temperature cycling, and pressure on the wires as exhaust gases pass through the substrate body.

Wires 22 may alternatively, or in addition, be fixed into the cells by bonding outer surfaces of the wires to interior surfaces of the cell walls 14. A suitable composite adhesive may be a blend of materials chosen to reduce temperature cycling stress effects in which there may be significant metal wire expansion/contraction, but vanishingly small expansion/contraction of the ceramic substrate. This differential can produce stresses at the adhesive interface between the two materials. By using such a composite adhesive, movement of a bonded wire relative to the surrounding cell walls may be reduced while maintaining high heat transfer. Metal inserts may alternatively be introduced into selected cells as molten metal, metal slugs or metal power which is then treated to render the inserted material in such a state and relationship with the walls of the substrate as to retain metal in the selected cells.

Field produced by the electromagnetic induction coil can be tuned to the metal wire load to achieve high efficiency in terms of generating heat and reduced time to light-off temperature. Heating effects can be modified by appropriate selection of any or all of (a) the electrical input waveform to the coil 20, (b) nature and position of passive flux control elements such as the shield/concentrator 24, and (c) nature, position, and configuration of the coil 20. In addition, the applied field can be changed with time so that there is interdependence between the induction field/heating pattern and the particular operational phase; for example, pre-start-up, warm-up, highway driving, idling and for hybrids, intermittent change over from internal combustion to electric drive. In an alternative configuration, more than one coil can be used to obtain desired induction effects. For example, a substrate body having an annular cross-section can have one energizing coil at the substrate perimeter and a second energizing coil at the substrate core (not shown).

The heating pattern can be determined by appropriate location and configuration of the metal pins or wires 22. A suitable metal for the inserted wire is a ferromagnetic metal such as stainless steel grade 430 which has high magnetic permeability and corrosion resistance. Lower permeability alloys such as 300 or 400 series stainless steels may also be used. Alternative metals can be used depending on particular properties required in making the wire inserts and in fixing inserts within selected cells of the ceramic substrate. Such properties include metal formability, ductility, softness and elasticity. For shaping the direction and strength of magnetic flux in the substrate, lower magnetic permeability metals or alloys may be used for metal inserts in the outer cells with relatively higher magnetic permeability metals being used for metal inserts in the inner cells. Metals having very high magnetic permeability may also be used. For example, Kanthal iron-chrome-aluminum alloys used in wires manufactured by Sandvik have a relative permeability of 9000 and greater. High relative permeability can be achieved using wires made of other alloys including nickel-iron and iron-cobalt alloys.

In manufacturing a conventional catalyst converter, an outer layer of sheet metal is collapsed or shrunk onto an interior assembly consisting of a layer of compressible insulation and the ceramic core. The collapsed sheet metal forms a close fitting casing or can. Applying the casing involves reducing the outer diameter of a sheet metal cylinder using concentric jaws similar to a drill chuck to produce a permanent plastic deformation of the sheet metal.

An inductively heated unit of the sort shown in FIG. 1A has more layers than a conventional converter. During manufacture, the outer sheet metal jacket or can 18 is collapsed onto an assembly of interior elements including insulation blanket 16, the MFC layer 24, the coil 20, the insulation layer 27 and the ceramic substrate core 10. Assembly elements such as the insulation layers 16 and 27 are compressible layers but the ceramic substrate 10 is a non-compressible body. Each of the insulation layers is squeezed between adjacent layers of the assembly and provides structural support and dampening properties, the mats being compressed during shrinking to produce a desired mat density. The density of the compressed insulation is made high enough to produce enough grip to avoid the ceramic core 10 from sliding but not so high that the fibers in the insulation layers 16 and 27 break down which could cause the insulation to disintegrate in response to vibration and heating cycles.

In one exemplary structure, the MFC 24 is made from separate C-section segments which move more closely together during casing collapse and so permit reduction of the MFC diameter without damage. In an alternative structure, the MFC is made of mouldable material and is shrunk down similar to the sheet metal casing. Methods for shrinking the sheet metal onto an interior assembly are generally known in the vehicle exhaust and muffler industry. As applied to the inductively heated assembly of the present invention, a thin sheet metal cylinder (not shown) with the assembly elements inside the cylinder is put into a reducing mandrel die and an external ring(s) is pushed over the mandrel to squeeze the die sections and to reduce the external diameter of the cylinder and of internal compressible elements to a smaller diameter.

Radially reducing or shrinking the coil 20 is a problem because electrical continuity must be maintained. A standard coil has straight windings in a helix configuration. During canning, because the coil is in a constrained environment, it is not free to move but is held under a radial force that is increased to effect shrinking or compaction. As the coil diameter is reduced, it does not become more tightly wound along its length. Instead, the coil wire tends to twist until it buckles and arbitrarily located waves develop in the coil windings. The waves absorb the change in length of the wire while the length of the coil is maintained. An issue with waves forming in this way from a starting straight wound coil is that the number, location, and amplitude of the resulting wave elements are unpredictable. Sometimes there is one large wave or bow and sometimes several small waves of varying amplitude, neither of which is desirable. The bows can shift the MFC and may change the focus area of the magnetic field produced by the coil when in use. Further, the MFC and insulation mat which sandwich the coil may be dragged along by the coil wire as it locally deforms, causing damage to these elements and to the coil wire itself. In some instances, the wire may break, thereby rendering the coil useless as an element for induction heating.

In view of these limitations, a coil according to an aspect of the invention is wound in a deliberate and predetermined manner. As shown in FIGS. 4 and 5, in one embodiment of the invention, a particular form of winding the coil 20 wire onto a former or mandrel 28 is adopted. The winding method renders the assembly less prone to damage during the canning process. In the winding process, small waves, bends or similar perturbations 30 are deliberately introduced into the coil turns. The size and amplitude of the waves 30 are selected based on the expected compaction of the coil during compression and, to the extent possible, are distributed evenly throughout the entire coil 20. In the arrangement shown in FIG. 4, waves 30 introduced into adjacent windings or turns 32 line up with each other to produce a closely nested coil 20, but such nesting is not essential. For example, the windings can be spaced apart or separated by a spacer wire.

In the example illustrated, the wire is wound around the circumference of cylindrical former 28 with a small zigzag formation. The amplitude displacement of the coil is roughly one coil wire diameter up and one diameter down from a standard tight wound placement. A typical circumference or single turn could have two or more waves or as many as 10. In the illustrated example, the introduced wave is a complete cycle from low to high and back to low again. The introduced waves 30 produce small, predictable weak spots in the coil circumference. The weak spots accommodate and equally share displacement during the compaction process while still maintaining the relative integrity of the induction coil 20. While a zig-zag wave is shown, a sinusoidal wave can alternatively be introduced using an appropriate winding tool. Similarly, while a full cycle wave is shown, the perturbation may for example be a half cycle, a one and half cycle, etc. Although the winding method has been described in the context of winding the wire on the outside surface of an interior former or mandrel 28, the wire can alternatively be wound on the inside surface of an exterior mandrel.

In one example, a 43 mm tall by 140 mm diameter coil requires a 8 mm reduction in diameter resulting in a final shrunk diameter of 132 mm. The difference in circumference from before and after shrinking is 25.1 mm. For a standard straight wound coil, a single bow may be produced randomly at a weak point accounting for all 25.1 mm of displacement, this bow being very large in relation to a 43 mm tall coil. With a wave coil with 12 waves, each wave is responsible for $1/12^{th}$ of the displacement or roughly 2 mm per wave which. This results in a predictable and small change in the coil of roughly 2 mm versus a 43 mm tall coil.

After winding the wire and wire perturbations, the coil must be, at least temporarily, fixed to enable handling and assembly of the IH system. Any of a number of fixing techniques can be used. In a first technique, a suitable glue is used. A porous electrical insulation sheathing around the coil wire absorbs high or low viscosity liquid adhesive into its fibres and, upon drying, makes the assembly stable enough to be handled and used in post processing and before canning. The glue allows minor flexibility during canning to facilitate shifting of the wave coil as the diameter changes. In another technique, the innate memory of the copper wire core, once plastically deformed, tends to maintain the shape of the wound wire. Winding the coil onto a former configured as an inner mandrel introduces some memory into the coil but typically there is a tendency for the coil to unwind slightly as the induced memory is at a diameter slightly larger than desired. The coil is alternatively wound onto a smaller diameter mandrel than desired and then allowed to slightly spring open to the desired diameter for assembly. This can also be extended to CNC bending, common in the spring industry. Here, a mandrel is not necessary to wind the coil. Instead, computer controlled bending of the coil is progressive and automatically controlled as the coil is fed into the winding machine. Rollers and dies gradually and minutely deform the coil to the desired shape, diameter and profile, and the coil tends to wind itself with little to no guidance required. In another technique, if rigid MFC plates are used and they float or shift radially as the diameter is reduced during canning, then a pocket on the inside diameter of these plates can be used to house the coil. Such a pocket permits a small amount of movement in the coil and between the coil and the MFC. The coil and MFC remain concentric during shrinking as the pocket aligns the two components together. In a further technique, a 'soft' MFC functions like tape around the coil to hold the windings together. The soft MFC material readily deforms to mechanically grab the fibers of the coil sheathing to prevent the coil from unwinding or separating from the MFC. The MFC may further mold to the coil as the outside is further shrunk in size during canning. The soft MFC material is viscous enough that it does not deform absent being acted upon by the shrinking sheet metal or other external force. In another technique, tape is used to hold the insulation bands and the wound coil onto the ceramic substrate during stuffing and canning. The tape simply burns away when the exhaust component goes into service leaving the assembly held together within the sheet metal. In another technique, lead ends that are not a part of the windings but which extend from the end turns are held parallel and at a fixed distance from one another. The fixing of the two lead end positions limits geometric changes in the coil. Similar to springs, the leads can be brought closer together or separated farther apart to collapse or spring open the coil slightly if the coil needs to be set in place. In yet another technique, the coil wire is wound directly onto the insulation layer/ceramic core combination. Coil winding tension is set so as not to compress the insulation too much. Final compaction of the coil and insulation occurs during shrinking where both undergo a small reduction in diameter.

Once the coil is fixed, it is removed from the former and taken to a station for assembling the IH assembly. The various layers of the assembly—the ceramic core 10, the insulation layer 16, the coil 20, the MFC 24, and the insulation layer 27 are manoeuvred together so that they form a concentric loose assembly. A sheet metal cylinder is positioned around the HI assembly and is collapsed down onto the assembly by one of the methods known in the vehicle exhaust industry and previously described. In the course of the compression and shrinkage, the outer insulation layer, MFC presses uniformly against the coil which, in turn, causes the interior insulation layer to yield. The introduced small amplitude waves 30 in the coil grow slightly along the surface of the adjacent interior insulation layer to accommodate and relieve longitudinal compressive stresses in adjacent parts of the coil turn containing the wave. The overall result is a coil that is slightly taller in height and slightly smaller in diameter than the original but without unwanted twisting or other deformation of the wire that might otherwise damage elements of the assembly.

Typically, at least three waves (each with one peak and one valley) are introduced into each winding. The apex for a given peak or valley tends to stay in the same radial plane and it is mainly an increase in the angle of straighter sections between the peaks and valleys that keeps the coil concentric at the smaller diameter. In another example, a 145.3 mm diameter coil was shrunk down to 139.3 mm following a diameter reduction of 6 mm. This translated to an 18.8 mm change in length of the circumference of the coil; i.e. in the length of a winding. By using a 5 wave coil (5 peaks and 5 valleys), this 18.8 mm change in circumference is divided by 10 and therefore 1.88 mm is absorbed at each peak or valley. The result is a slight increase in the amplitude of the peak or valley which allows it to absorb the 1.88 mm.

The manner in which the inductively heated assembly fits within the can housing and the degree of compaction resulting from the controlled collapse of the can are precisely planned in order to minimize the risk of long term structural and electrical damage due to vibration, temperature, or the elements. In particular, the number and amplitude of introduced waves or perturbations is precisely selected. Where there is a finite amount of space to fit the completed assembly, a change in diameter of the coil is absorbed not at one location, but around the entire turn circumference. The coil length grows incrementally during compaction, with multiple waves being formed. Having no waves introduced during the winding process would mean that the extra coil length generated during compaction results in a number of waves occurring at random points and extending in random directions. For example, a coil diameter reduction from 140 mm diameter to 135 mm generates 15 mm of extra coil circumference/length in each coil turn. One wave deliberately introduced into a turn when winding absorbs all 15 mm resulting in a high amplitude wave while, for example, 10 deliberately introduced waves result in 10 low amplitude waves. A high number of waves in a turn is generally preferred subject to other restrictions such as available space and expected diameter change.

FIG. 4 shows a coil in which wave perturbations have been introduced, the coil being shown before shrinkage of the coil such as would occur upon collapsing of sheet metal casing material onto the assembly. FIG. 5 shows the coil after shrinkage or compaction where the higher amplitude waves are evident.

Although the winding method has been described with a former having a cylindrical outer surface, the method admits of other former shapes such as non-cylindrical formers of circular section, and non-circular section formers such as those having elliptical and generally polygonal section, in each case to fit the coil for use in a similarly shaped IH assembly. In applying the method to such former shapes, it is of advantage to site the waves or perturbations against a flat or gently curved surface part of the former rather than for example at an apex between two surface planes, whether that apex is outwardly projecting or inwardly projecting as in a re-entrant form.

One aspect of introducing waves into a coil during winding is that it does not matter whether there is one coil, several coils, coils windings that are tightly packed, or coil windings that are spaced apart. An adjacent winding is not necessary in order to provide a uniform constraint because the constraint is provided by the approach of the MFC/insulation layer immediately radially outside the coil as they progressively collapse down onto the coil wire and the unyielding core part of the assembly.

Figure 6:
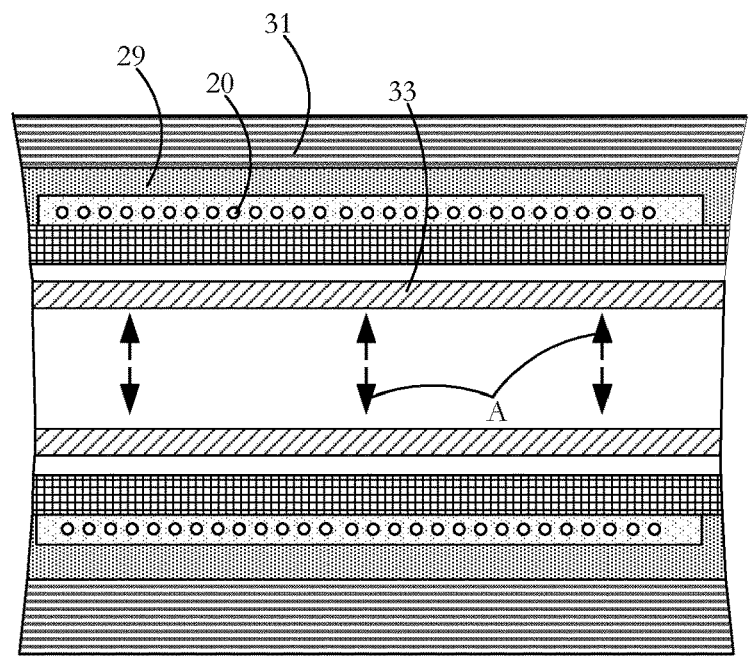
FIG. 6 is a scrap longitudinal sectional view of an article of manufacture at a stage in such manufacture and showing a coil that has been wound according to an embodiment of the method of the invention.

Although the winding method has been described in the context of collapsing an exterior jacket onto an interior wound coil, the principle of the invention can, as shown in FIG. 6, be used to obtain controlled non-damaging expansion of a wound wire coil 20. In such a method the wire is wound around and onto an inner surface of an annular cylinder or like former (not shown) with perturbations of predetermined form, size and frequency being introduced into the wire. The perturbation form, size and frequency are chosen dependent upon an expected radially outward movement of the coil as a compressible layer 29 of the concentric assembly located radially outwardly of the coil is compressed until halted by a non-compressible exterior shell 31. As in the prior embodiment, resulting stresses in the wire generated during the expansion are at least partially relieved by alteration of the perturbation from an initial shape and size to a subsequent shape and size. In this case, high amplitude perturbations or waves introduced during winding almost straighten out as the diameter increases.

In the specification, the term 'wire' is intended to cover both conventional conducting wire used in electrical structures and also other filamentary and stranded materials which, in the course of manufacture or use, is wound onto a former and is subject to compaction. In the specification, the term 'coil is intended to cover both a conventional coil made using a single length of wound wire but also a series of loops of wire. In the specification, the verb 'winding' or 'wound' is intended to cover both conventional winding where wire is taken round and round a former but also the act of threading a series of wire turns or loops onto the former from one end of the former.

What is claimed is:

1. A method comprising:
   winding a wire onto a surface of a former to form a coil of wire turns,
   introducing into at least one turn of the coil at least one perturbation, the perturbation formed in a length of the wire less than the full length of one wire turn and projecting along said surface, the perturbation having an initial shape and size,
   arranging a concentric assembly comprising a compressible layer of material, the coil, and a non-compressible body so that the compressible layer is between the coil and the non-compressible body,
   radially driving a plastically deformable body towards the concentric assembly whereby to compress the compressible layer and to fix the compressed compressible layer and the coil adjacent thereto against the non-compressible body, with the plastically deformable body deforming to a surface shape of the compressed assembly,
   whereby stresses in the wire generated by said radial driving are at least partially relieved by reconfiguration of the perturbation from its initial shape and size to a different shape and size.

2. The method claimed in claim 1, wherein the plastically deformable body is a jacket surrounding the concentric assembly and said radially driving is such as to radially collapse the jacket onto the concentric assembly.

3. The method claimed in claim 1, wherein the non-compressible body has a cross-sectional shape, that is one of circular, elliptical and polygonal.

4. The method claimed in claim 1, further comprising winding the turns of the wire on the former so that successive turns and the perturbations formed therein are nested together on said surface.

5. The method claimed in claim 1, further comprising winding the wire turns on the former so that successive turns are evenly spaced along the surface.

6. The method claimed in claim 1, wherein the perturbation shape is in the form of a section of a sinusoidal wave.

7. The method claimed in claim 1, wherein the at least one perturbation is introduced by winding the wire so as to zig zag about a nominal tight wound line.

8. The method claimed in claim 1, wherein the coil has a plurality of turns and the initial shape and size of the perturbation in one wire turn generally matches the initial shape and size of the perturbations in the other wire turns.

9. The method claimed in claim 1, wherein the coil has a plurality of wire turns and the position of the perturbation in one wire turn is generally linearly aligned with the positions of the perturbations in the other wire turns, the linear alignment extending generally parallel to a central axis of the concentric assembly.

10. The method claimed in claim 1, wherein the wire is induction heating wire for use in inductively heating metal located in the non-compressible body.

11. The method claimed in claim 10, wherein the non-compressible body comprises a honeycomb ceramic substrate having a plurality of cells for passage from an input end of the ceramic substrate to an output end thereof of gaseous emissions, the heating metal located in respective ones of a subset of the plurality of cells.

12. The method claimed in claim 2, wherein the jacket comprises a radially deformable layer of sheet metal.

13. The method claimed in claim 1, wherein the plastically deformable body is hollow and the concentric assembly is interior of the plastically deformable body.

14. The method claimed in claim 1, wherein the concentric assembly forms a hollow structure and the plastically deformable body is interior of the concentric assembly.

15. The method claimed in claim 14, wherein the radially driving is such as to radially expand the plastically deformable body against the concentric assembly.

* * * * *